(12) United States Patent
Chaudhary et al.

(10) Patent No.: US 10,386,262 B2
(45) Date of Patent: Aug. 20, 2019

(54) LEAK IDENTIFICATION IN A MASS TRANSPORT NETWORK

(71) Applicant: Utopus Insights, Inc., Valhalla, NY (US)

(72) Inventors: Harsh Chaudhary, Briarcliff Manor, NY (US); Younghun Kim, White Plains, NY (US); Tarun Kumar, Mohegan Lake, NY (US); Abhishek Raman, Santa Clara, CA (US); Rui Zhang, Ossining, NY (US)

(73) Assignee: Utopus Insights, Inc., Valhalla, NY (US)

( * ) Notice: Subject to any disclaimer, the term of this patent is extended or adjusted under 35 U.S.C. 154(b) by 122 days.

(21) Appl. No.: 15/009,340

(22) Filed: Jan. 28, 2016

(65) Prior Publication Data

US 2017/0219454 A1 Aug. 3, 2017

(51) Int. Cl.
*G01M 3/28* (2006.01)

(52) U.S. Cl.
CPC .................. *G01M 3/2815* (2013.01)

(58) Field of Classification Search
None
See application file for complete search history.

(56) References Cited

U.S. PATENT DOCUMENTS

| | | | | |
|---|---|---|---|---|
| 4,651,559 A | * | 3/1987 | Horigome | G01M 3/2815 73/40.5 R |
| 5,343,737 A | * | 9/1994 | Baumoel | G01F 1/668 73/40.5 R |
| 5,355,324 A | | 10/1994 | Zhang | |
| 5,416,724 A | * | 5/1995 | Savic | F17D 5/06 702/51 |
| 5,428,989 A | * | 7/1995 | Jerde | G01M 3/243 73/40.5 R |
| 5,675,506 A | * | 10/1997 | Savic | F17D 5/06 702/51 |
| 6,970,808 B2 | * | 11/2005 | Abhulimen | F17D 5/02 702/185 |
| 7,920,983 B1 | * | 4/2011 | Peleg | G01M 3/2807 137/1 |

(Continued)

FOREIGN PATENT DOCUMENTS

WO 2010067128 A1 6/2010

OTHER PUBLICATIONS

Barat, Gas Rotameter Corrections, Memorandum, 1997, pp. 1-3, obtained from https://web.njit.edu/~barat/ChE496_Spring2011/gas_rotameters.pdf on Jun. 12, 2016.*

(Continued)

*Primary Examiner* — Omar F Fernandez Rivas
*Assistant Examiner* — Robert S Brock
(74) *Attorney, Agent, or Firm* — Ahmann Kloke LLP

(57) ABSTRACT

A method and system method to detect a leak within a pipeline network include measuring pressure at each of a plurality of sensors distributed along the pipeline network as a time-varying pressure signal. Tuning a model is based on gas mass conservation law in the absence of the leak, the tuning including obtaining the time-varying pressure signal from each of the plurality of sensors, and monitoring the time-varying pressure signals is done to detect the leak based on the model.

17 Claims, 3 Drawing Sheets

(56) References Cited

U.S. PATENT DOCUMENTS

| | | | | |
|---|---|---|---|---|
| 8,930,150 | B2* | 1/2015 | Israeli | G01M 3/2815 |
| | | | | 702/51 |
| 9,037,422 | B2 | 5/2015 | McHugh et al. | |
| 9,052,703 | B2* | 6/2015 | Cheng | G05B 17/02 |
| 9,395,262 | B1* | 7/2016 | Kumar | G01M 3/2815 |
| 9,897,261 | B2* | 2/2018 | Albertao | F17D 5/02 |
| 2002/0124633 | A1 | 9/2002 | Yang et al. | |
| 2013/0066568 | A1 | 3/2013 | Alonso | |
| 2013/0199273 | A1* | 8/2013 | Hoffman | F17D 5/04 |
| | | | | 73/40.5 R |
| 2013/0327412 | A1* | 12/2013 | DeGeorge | B23P 11/00 |
| | | | | 137/15.01 |
| 2014/0052421 | A1* | 2/2014 | Allen | G05B 17/02 |
| | | | | 703/2 |
| 2014/0142870 | A1* | 5/2014 | Duan | G01M 3/2815 |
| | | | | 702/47 |
| 2014/0229124 | A1* | 8/2014 | Albertao | F17D 5/02 |
| | | | | 702/47 |
| 2014/0290343 | A1* | 10/2014 | Kulkarni | G01M 3/002 |
| | | | | 73/40.5 R |
| 2014/0305513 | A1* | 10/2014 | McDowell | F17D 5/06 |
| | | | | 137/15.11 |
| 2015/0308919 | A1* | 10/2015 | Zhang | G01M 3/243 |
| | | | | 702/51 |
| 2017/0152648 | A1* | 6/2017 | Hammond | G01F 1/667 |
| 2017/0176957 | A1* | 6/2017 | Chaudhary | G01F 22/02 |
| 2017/0177008 | A1* | 6/2017 | Chaudhary | G01M 3/2807 |

OTHER PUBLICATIONS

Yolanda Bolea, Vicenc Puig, Joaquim Blesa, Linear parameter varying modeling and identification for real-time control of open-flow irrigation canals, Environmental Modelling & Software 53 (2014) pp. 87-97.*

T. Davitashvili, "On One Method of Accidental Leak localization in the Branched Main Gas Pipeline," In Recent Advances in Energy, Environment& Economic Development, Mathematics and Computers in Science and Engineering Series/6, Proc. of the WSEAS' 3rd International Conference on Development, Energy, Environment ,Economics (DEEE'12), Dec. 2-4, P.*

Ricardo Maronna, Jorge Arcas, Data reconciliation and gross error diagnosis based on regression, Computers and Chemical Engineering 33 (2009) pp. 65-71.*

J.P. Modisette, Automatic Tuning of Pipeline Models, Pipeline Simulation Interest Group, PSIG Annual Meeting, Oct. 20-22, Palm Springs, California, 2004, pp. 1-17.*

P. L. Dos Santos, T. P. Azevedo-Perdicoulis, J. A. Ramos, J. L. M. De Carvalho, G. Jank and J. Milhinhos, "An LPV Modeling and Identification Approach to Leakage Detection in High Pressure Natural Gas Transportation Networks," in IEEE Transactions on Control Systems Technology, vol. 19, No. 1, pp. 77-92, Jan. 2011.*

Whaley et al, Tutorial of software leak detection methods, Scientific Software-Intercomp, pp. 1-19, 1992, obtained from http://web.archive.org/web/20040727190434/http://www.psig.org/papers/1987/9204.pdf on Jun. 12, 2016.*

Yang et al, Research on Leakage Detection and Analysis of Leakage Point in the Gas Pipeline System, Open Journal of Safety Science and Technology, 2011, 1, pp. 94-100.*

Di Blasi, Martín, and Carlos Muravchik. "Leak detection in a pipeline using modified line volume balance and sequential probability tests." Journal of pressure vessel technology 131, No. 2 (2009): 021701. pp. 1-10.*

Magnis, Lionel, and Nicolas Petit. "Impact of imprecise dating of measurements for bulk material flow network monitoring." IFAC Proceedings vols. 46, No. 28 (2013): 274-279.*

Zhang, Jun, and Enea Di Mauro. "Implementing a reliable leak detection system on a crude oil pipeline." Advances in Pipeline Technology (1998). 12 pages (Year: 1998).*

Chis, Timur "Pipeline Leak Detection Techniques", Annals. Computer Science Series, 2007, pp. 1-10.

De Febbo, Maurino "A new generation of leak-detection systems for pipelines based on acoustic technology", Pipelines International, 2013, pp. 1-5.

EPA, "Standard Test Procedures for Evaluating Leak Detection Methods: Pipeline Leak Detection Systems", EPA/530/UST-9/010, Sep. 1990. pp. 1-174.

Ling et al., "An New Method for Leak Detection in Gas Pipelines", Society of Petroleum Engineers, Oil and Gas Facilities, vol. 4, Issue 2, Apr. 2015, pp. 1-2 (Abstract).

Wang et al., "Leak Detection for Gas and Liquid Pipelines by Online Modeling", SPE Projects, Facilities & Contruction, vol. 2, Issue 2, Jun. 2007, pp. 1-2 (Abstract).

Zhang et al., Statistical Pipeline Leak Detection Techniques for All Operating Conditions, 26th Environmental Symposium & Exhibition, Mar. 27-30, 2000, pp. 1-6.

List of IBM Patents or Patent Applications Treated as Related; (Appendix P), Filed Jan. 28, 2016; 2 pages.

List of IBM Patents or Patent Applications Treated as Related; (Appendix P), Filed Apr. 8, 2016; 2 pages.

* cited by examiner

LEAK IDENTIFICATION IN A MASS TRANSPORT NETWORK

BACKGROUND

The present invention relates to mass transport networks, and more specifically, to leak identification in a mass transport network.

Pipeline networks that transport water, natural gas, or other resources can traverse hundreds of miles at or above the surface. Sensors and other equipment may be located at regular or irregular intervals of the network (e.g., every 30-100 miles). In the exemplary case of a gas pipeline, the equipment may include a compression station that increases pressure to push the gas along the pipeline. A supervisory control and data acquisition (SCADA) system obtains data from and provides control to the remote sensors and equipment.

SUMMARY

Embodiments include a method, system, and computer-program product to detect a leak within a pipeline network. Aspects include measuring pressure at each of a plurality of sensors distributed along the pipeline network as a time-varying pressure signal; tuning, using a processor, a model based on gas mass conservation law in the absence of the leak, the tuning including obtaining the time-varying pressure signal from each of the plurality of sensors; and monitoring, using the processor, the time-varying pressure signals to detect the leak based on the model.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, a pipeline network may transport natural gas, water, or another resource over hundreds of miles. While sensors and other equipment are located along the pipeline, monitoring of every inch of the pipeline is impractical. Thus, a leak may occur along the pipeline, causing a loss of the resource among other issues, without the sensors readily identifying the leak. Embodiments of the systems and methods detailed herein relate to identification of a leak in a natural gas pipeline in which pressure is measured by sensors located along the pipeline. The embodiments are based on the fact that, according to the mass conservation law, gas mass into the pipeline and out of the pipeline must be the same.

Figure 1:
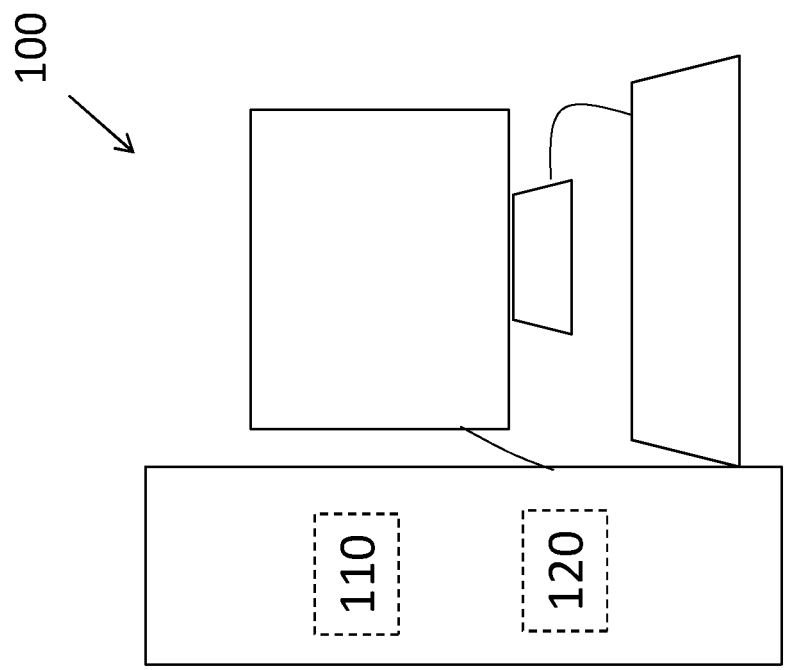
FIG. 1 is a block diagram of a system that detects a leak in a pipeline network according to embodiments.
Figure 1:
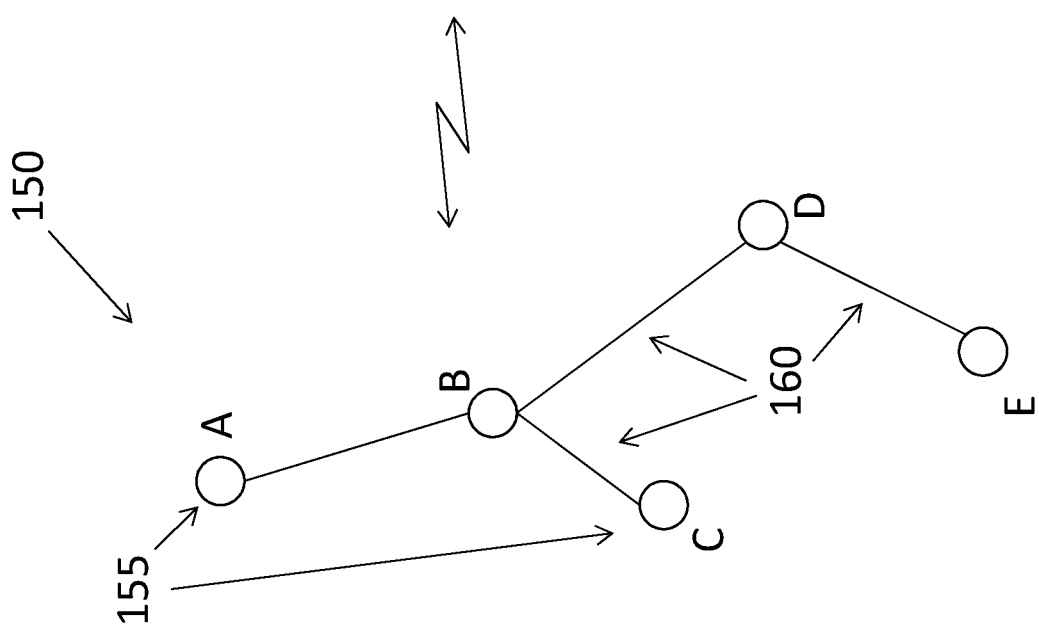

FIG. 1 is a block diagram of a system 100 that detects a leak in a pipeline network 150 according to embodiments of the invention. The pipeline network 150 includes sensors 155 at known locations based on geopositioning. As noted above, when the pipeline network 150 is a natural gas pipeline according to the embodiments herein, each of the sensors 155 measures pressure as a time-varying signal. The pipeline network 150 also includes pipe segments 160 that are interconnections between each pair of sensors 155. The exemplary pipeline network 150 in FIG. 1 includes exemplary sensors A, B, C, D, and E. The system 100 includes one or more memory devices 110 and one or more processors 120. The system 100 includes additional known components that perform functions such as, for example, communication with the sensors 155 of the physically connected network 150. The memory device 110 stores instructions implemented by the processor 120 to identify a leak according to the embodiments detailed below. The memory device 110 may additionally store a local copy of the asset registry that includes the geopositions of the sensors 155, for example.

Figure 2:
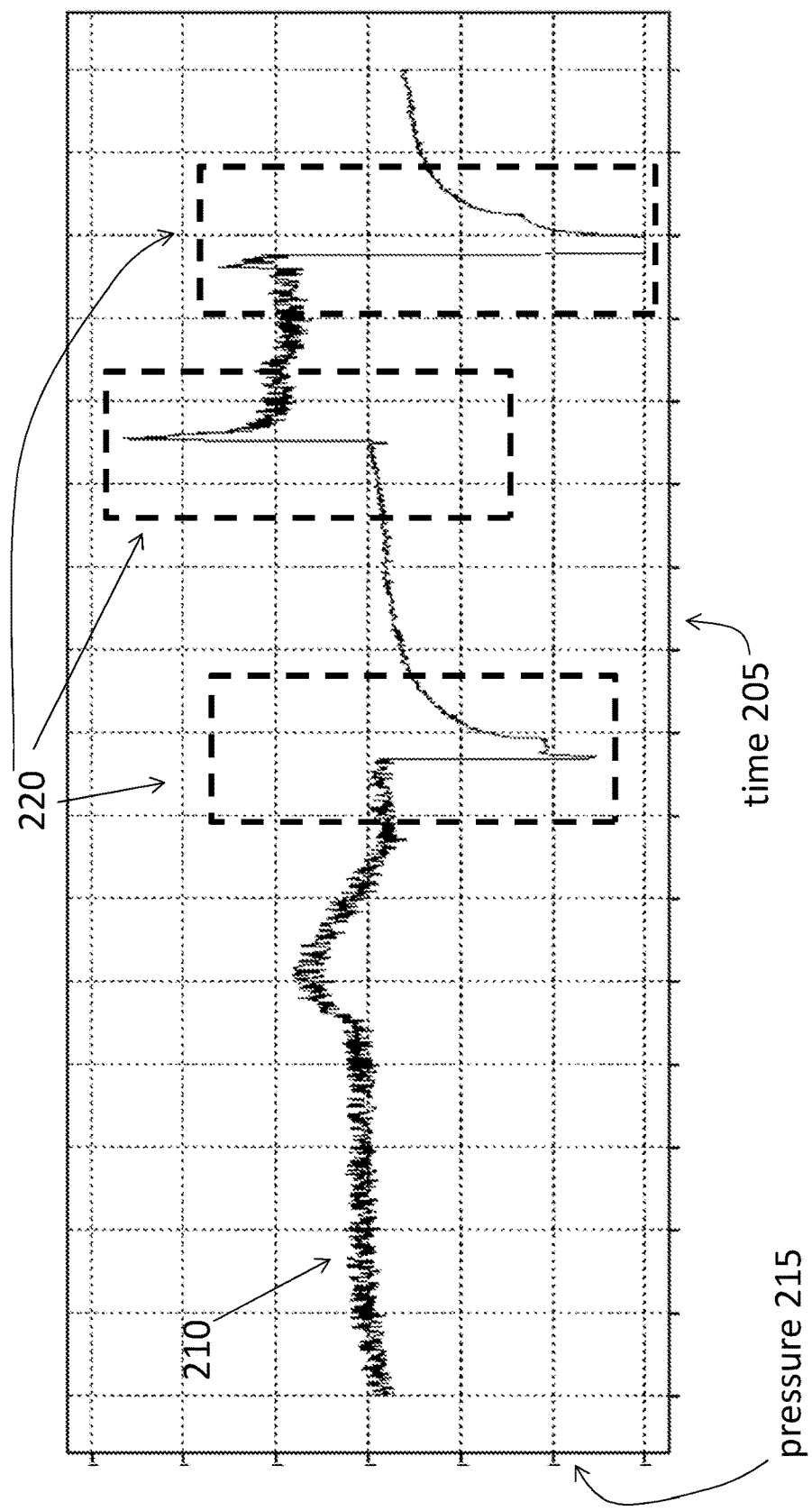
FIG. 2 shows an exemplary time-varying pressure signal recorded by a sensor of pipeline network according to embodiments.

FIG. 2 shows an exemplary time-varying pressure signal 210 recorded by a sensor 155 of pipeline network 150 according to embodiments. The exemplary time-varying pressure signal 210 is shown with time indicated along axis 205 and pressure indicated along axis 215. Patterns 220 may be detected within the pressure signal 210 to learn information about the pipeline network 150. For example, in the gas network, compression stations may be located along the pipeline to increase pressure and, thus, facilitate movement of the gas. The increased pressure reaching each sensor 155 may be detected according to the associated pattern 220. The pattern 220 detection may be done by any number of known methods.

The following set of partial differential equations describes gas behavior under ideal conditions:

$$\frac{\partial Q(s,t)}{\partial t} = -S\frac{\partial P(s,t)}{\partial s} - \frac{\lambda c^2}{2DS}\frac{Q^2(s,t)}{P(s,t)} \qquad [\text{EQ. 1}]$$

$$\frac{\partial P(s,t)}{\partial t} = -\frac{c^2}{S}\frac{\partial Q(s,t)}{\partial s} \qquad [\text{EQ. 2}]$$

In the equations above, s is space, t is time, P is edge pressure-drop, Q is mass flow, S is cross-sectional area of the pipe segments 160, D is pipe diameter of the pipe segments 160, c is isothermal speed of sound, and $\lambda$ is the friction factor in the pipe network 150. EQ. 1 and EQ. 2 would hold true in the absence of a leak and under ideal conditions. The equations above could be approximated as follows:

$$\dot{x}(t) = \bar{A}_0 x(t) + \bar{B}_0 u(t) + \bar{A}_{\tilde{p}}\tilde{p}(t)x(t) + \bar{B}_{\tilde{p}}\tilde{p}(t)u(t) \qquad [\text{EQ. 3}]$$

$$y(t) = \bar{C}_0 x(t) + \bar{D}_0 u(t) + \bar{C}_{\tilde{p}}\tilde{p}(t)x(t) + \bar{D}_{\tilde{p}}\tilde{p}(t)u(t) \qquad [\text{EQ. 4}]$$

In EQ. 3 and EQ. 4, $u(t)=Q_0(t)$ and is the input mass flow rate, $y(t)=Q_n(t)$ and is the output mass flow rate, and x(t) is an internal state variable given by:

$$x(t) = [Q_1(t)\Delta P_1(t)]^T \qquad [\text{EQ. 5}]$$

The coefficients in EQ. 3 are internal (pipeline system) dynamics (A) and the effect of input on the dynamics (B) and are given by:

$$\bar{A}_0 = \begin{bmatrix} \alpha_{1,1}(\tilde{p})|_{\tilde{p}=0} & \alpha_{1,2} \\ \alpha_{2,1}(\tilde{p})|_{\tilde{p}=0} & 0 \end{bmatrix} \qquad [\text{EQ. 6}]$$

$$\bar{B}_0 = [0 \quad \beta_2(\tilde{p})|_{\tilde{p}=0}]^T \qquad [\text{EQ. 7}]$$

-continued $$\overline{A}_p = \begin{bmatrix} \frac{d\alpha_{1,1}}{d\tilde{p}}\Big|_{\tilde{p}=0} & 0 \\ \frac{d\alpha_{2,1}}{d\tilde{p}}\Big|_{\tilde{p}=0} & 0 \end{bmatrix}$$ [EQ. 8]

$$\overline{B}_p = \begin{bmatrix} 0 & \frac{d\beta_2}{d\tilde{p}}\Big|_{\tilde{p}=0} \end{bmatrix}^T$$ [EQ. 9]

The coefficients in EQ. 4 are the translation of internal state of observed outputs (C) and input that translates to output without considering internal dynamics (D) and are given by:

$$C_p = \lfloor \gamma_1(\tilde{p})\rfloor_{\tilde{p}=0} \quad 0 \rfloor$$ [EQ. 10]

$$D_p = \delta(\tilde{p})|_{\tilde{p}=0}$$ [EQ. 11]

$$C_p = \begin{bmatrix} \frac{d\gamma_1}{dp}\Big|_{\tilde{p}=0} & 0 \end{bmatrix}$$ [EQ. 12]

$$D_p = \frac{d\delta}{d\tilde{p}}\Big|_{\tilde{p}=0}$$ [EQ. 13]

Solving EQ. 3 and EQ. 4 provides:

$$\int_{t=0}^{\infty} Q_{input}(t)dt = \int_{t=0}^{\infty} \sum_{j \in DS} Q_j(t)dt$$ [EQ. 14]

DS is a set of downstream outlets and Q(t) is an isothermal mass flow rate. When there is no leak in the pipeline network, then:

$$\int_{t=0}^{\infty} p_{input}(t)f_{input}(t)dt = \int_{t=0}^{\infty} \sum_{j \in DS} p_j(t)f_j(t)dt$$ [EQ. 15]

The instantaneous pressure is indicated as p(t) and flow rate is indicated as f(t). That is, EQ. 15 indicates that, when there is no leak, isothermal mass flow rate (Q(t)) is the product of pressure and flow rate. Downstream volume is not part of EQ. 15, as indicated above. However, from the compressible gas transport equation, flow rate is known to be proportional to pressure difference, as follows:

$$f_j(t) \alpha p_{input}(t) - p_j(t)$$ [EQ. 16]

Thus, EQ. 15 may be re-written:

$$\frac{\int_{t=0}^{\infty} p_{input}(t)f_{input}(t)dt}{\int_{t=0}^{\infty} \sum_{j \in DS} p_j(t)(p_{input}(t) - p_j(t))dt} \approx \text{constant}$$ [EQ. 17]

When a leak occurs, then the leak is treated as another output point of the pipeline network 150, and EQ. 15 becomes:

$$\int_{t=0}^{\infty} p_{input}(t)f_{input}(t)dt =$$ [EQ. 18]

-continued $$\int_{t=0}^{\infty} \sum_{j \in DS} p_j(t)f_j(t)dt + \int_{t=0}^{\infty} p_{leak}(t)f_{leak}(t)dt$$

EQ. 18 may re-written as:

$$\frac{\int_{t=0}^{\infty} p_{input}(t)f_{input}(t)dt}{\int_{t=0}^{\infty} \sum_{j \in DS} p_j(t)f_j(t)dt} = 1 + \frac{\int_{t=0}^{\infty} p_{leak}(t)f_{leak}(t)dt}{\int_{t=0}^{\infty} \sum_{j \in DS} p_j(t)f_j(t)dt}$$ [EQ. 19]

Using EQ. 16, EQ. 19 may be further re-written as:

$$\frac{\int_{t=0}^{\infty} p_{input}(t)f_{input}(t)dt}{\int_{t=0}^{\infty} \sum_{j \in DS} p_j(t)(p_{input}(t) - p_j(t))dt} \approx \text{constant} + \text{offset}$$ [EQ. 20]

The "constant" in EQ. 20 is determined based on training the model on historical data and is a value close to 1. The "offset" in EQ. 20 is based on the leak. The input pressure $p_{input}$ is measured by the sensors 155 of the pipeline network 150. These measurements may include errors or calibration of the sensors 155 may degrade over time.

Accordingly, EQ. 14 is used to generate the following numerical minimization model:

$$\left| \sum_{i \in US} \sum_{t_{strt}+\Delta t_i}^{t_{end}+\Delta t_i} Q_i(t) - \sum_{i \in DS} \sum_{t_{strt}+\Delta t_i}^{t_{end}+\Delta t_i} Q_i(t) \right|_{norm}$$ [EQ. 21]

In EQ. 21, "US" refers to upstream, "DS" refers to downstream, the start time $t_{strt}$ and end time $t_{end}$ are delayed by $\Delta t_i$, which is a value between 0 and a predetermined maximum delay. By using a fixed start time $t_{strt}$ and end time $t_{end}$ but a delay $\Delta t_i$ value that is dependent on the sensor 155, the placement of the window is made variable based on each sensor 155 while the size is held constant for every sensor 155. The window size (i.e., the difference between tstrt and tend) is selected to ensure that the entire cycle of mass flow is captured. The first term of EQ. 21 is the calculated input quantity that uses a set of sensors 155 designated as upstream sensors, and the second term is the calculated output quantity that uses a set of sensors 155 designated as downstream sensors. The designation of upstream or downstream may be based on the geopositions of the sensors 155. The point within the pipeline network 150 that is selected to delineate sensors 155 as upstream sensors or downstream sensors may be moved. However, upstream and downstream sensors 155 may not be mixed. That is, in the exemplary pipeline network 150 shown in FIG. 1, sensor 155D may not be designated as an upstream sensor 155 if sensors 155C and E are designated as downstream sensors 155.

When there is no leak in the pipeline network 150, the two terms in EQ. 21 would be equal. $Q_i(t)$, the isothermal mass flow is given by:

$$Q_i(t) = p_i(t)f_i(t)$$ [EQ. 22]

In addition:

$$f_i = \alpha_i \hat{f}_i + \beta_i$$ [EQ. 23]

$$p_i = a_i \hat{p}_i + b_i$$ [EQ. 24]

As noted above, f is the flow rate, and p is the pressure. In EQs. 23 and 24, $\hat{f}$ and $\hat{p}$ are measured values, and f and p are modeled as affine functions. The true values of flow rate (f) and pressure (p) are obtained based on the affine mapping shown in EQs. 23 and 24. While pressure is measured ($\hat{p}$) by the sensors 155 in the gas pipeline, flow rate may not be measured. Thus, EQ. 16 may be used to obtain measured flow rate ($\hat{f}$) as a function of input pressure ($p_{input}$) and measured pressure ($\hat{p}$). During normal operation (without any leaks), the minimum values of coefficients $\Delta t_i$, $a_i$, $b_i$, $\alpha_i$, and $\beta_i$ that provide a solution to EQ. 21 may be found. As EQs. 23 and 24 indicate, $a_i$ and $\alpha_i$ are slopes and $b_i$ and $\beta_i$ are biases in the linear equations represented by EQs. 23 and 24. The solution to EQ. 21 would be such that the numerical minimization model value (result of EQ. 21) is below a threshold value (near 0). Then, with these tuned coefficient values, a leak may be identified when EQ. 21 does not produce a value below the threshold value. In the case of $\Delta t_i$, information obtained from geopositions of the sensors 155 and from monitoring may be used to limit the search space (range of values that must be searched to determine $\Delta t_i$ for each sensor 155).

Figure 3:
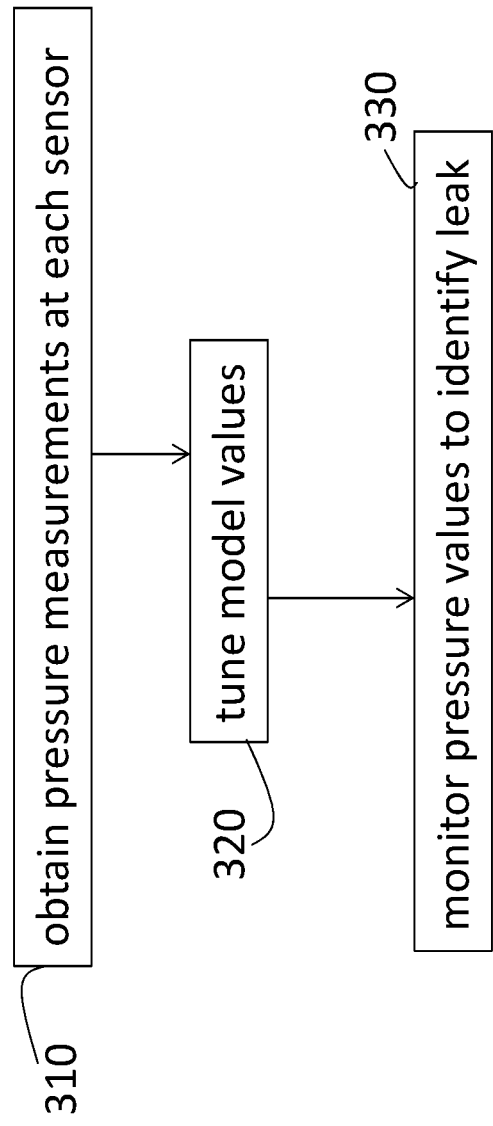
FIG. 3 is a process flow of a method of identifying a leak in a pipeline network according to embodiments.

FIG. 3 is a process flow of a method of identifying a leak in a pipeline network 150 according to embodiments. At block 310, the processes include obtaining pressure measurements at each sensor 155 in the pipeline network 150. Tuning model values, at block 320, includes tuning the values of $\Delta t_i$, $a_i$, $b_i$, $\alpha_i$, and $\beta_i$ when there is no leak in the pipeline network 150 based on performing a numerical minimization of EQ. 21 using EQs. 23 and 24 to determine Q(t) per EQ. 22. Monitoring pressure values to identify a leak, at block 330, refers to using the tuned values of $\Delta t_i$, $a_i$, $b_i$, $\alpha_i$, and $\beta_i$ and measured pressure to determine Q(t) and noting when EQ. 21 is no longer approximately 0 (below a predefined threshold value). When this is the case, a leak is indicated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of identifying a leak within a pipeline network, the method comprising:
   measuring pressure at each of a plurality of sensors distributed along the pipeline network as a time-varying pressure signal;
   tuning, using a processor, a model based on gas mass conservation law in the absence of the leak, the tuning including obtaining the time-varying pressure signal from each of the plurality of sensors;
   monitoring, using the processor, the time-varying pressure signals to detect the leak based on the model, wherein the tuning the model includes tuning a numerical minimization model of:

$$\left| \sum_{i \in US} \right][ \sum_{t_{strt}+\Delta t_i}^{t_{end}+\Delta t_i} Q_i(t) - \sum_{i \in DS} \sum_{t_{strt}+\Delta t_i}^{t_{end}+\Delta t_i} Q_i(t) \right|_{norm},$$

US refers to upstream sensors among the plurality of sensors, DS refers to downstream sensors among the plurality of sensors, $t_{strt}$ to $t_{end}$ is a selected time interval with a delay $\Delta t_i$ specific to each of the upstream sensors or the downstream sensors, $t_{strt}$ and $t_{end}$ are selected to capture an entire cycle of mass flow, and $Q(t)$ is isothermal mass flow rate, and the selected time interval is a same duration for every one of the upstream sensors and the downstream sensors;
   comparing, using the processor, the numerical minimization model with a predetermined threshold value; and
   identifying a leak within the pipeline network when the numerical minimization model is greater than the predetermined threshold value.

2. The method according to claim 1, wherein the tuning the model includes determining $Q(t)$ for each sensor as being proportional to:

$$p_i(t)f_i(t), \text{ where}$$

$p(t)$ is pressure and $f(t)$ is flow rate.

3. The method according to claim 2, wherein the determining $Q(t)$ includes determining pressure and flow rate based on affine mapping according to:

$$f_i = \alpha_i \hat{f}_i + \beta_i \text{ and } p_i = a_i \hat{p}_i + b_i, \text{ where}$$

$\hat{f}$ and $\hat{p}$ are measured flow rate and measured pressure values, respectively, and $a_i$, $b_i$, $\alpha_i$, and $\beta_i$ are determined based on tuning the numerical minimization model.

4. The method according to claim 3, further comprising obtaining flow rate from the time-varying pressure signal of each of the plurality of sensors based on:

$f_j(t) \propto \alpha p_{input}(t) - p_j$, where $p_{input}$ refers to pressure at an input of the pipeline network.

5. The method according to claim 3, wherein the tuning includes determining minimum values of $\Delta t_i$, $a_i$, $b_i$, $\alpha_i$ and $\beta_i$ to solve the numerical minimization model in the absence of the leak, solving including one of the numerical minimization model values being below a threshold value.

6. A system to identify a leak within a pipeline network, the system comprising:
a plurality of sensors distributed along the pipeline network, each sensor configured to measure pressure as a time-varying pressure signal; and
a processor configured to tune a model based on gas mass conservation law in the absence of the leak based on the time-varying pressure signal from each of the plurality of sensors, and monitor the time-varying pressure signals to detect the leak based on the model, wherein the model is a numerical minimization model of:

$$\left| \sum_{i \in US} \right] [ \sum_{t_{strt}+\Delta t_i}^{t_{end}+\Delta t_i} Q_i(t) - \sum_{i \in DS} \sum_{t_{strt}+\Delta t_i}^{t_{end}+\Delta t_i} Q_i(t) \right|_{norm} ,$$

US refers to upstream sensors among the plurality of sensors, DS refers to downstream sensors among the plurality of sensors, $t_{strt}$ to $t_{end}$ is a selected time interval with a delay $\Delta t_i$ specific to each of the upstream sensors or the downstream sensors, $t_{strt}$ and $t_{end}$ are selected to capture an entire cycle of mass flow, and Q(t) is isothermal mass flow rate, the selected time interval is a same duration for every one of the upstream sensors and the downstream sensors, compare the numerical minimization model with a predetermined threshold value, and identify a leak within the pipeline network when the numerical minimization model is greater than the predetermined threshold value.

7. The system according to claim 6, wherein Q(t) is determined for each sensor i as being proportional to:

$p_i(t) f_i(t)$, where p(t) is pressure and f(t) is flow rate.

8. The system according to claim 7, wherein the processor determines pressure and flow rate based on affine mapping according to:

$f_i = \alpha_i \hat{f}_i + \beta_i$ and $p_i = a_i \hat{p}_i + b_i$, where $\hat{f}$ and $\hat{p}$ are measured flow rate and measured pressure values, respectively, and $a_i$, $b_i$, $\alpha_i$, and $\beta_i$ are determined based on tuning the numerical minimization model.

9. The method according to claim 8, further comprising obtaining flow rate from the time-varying pressure signal of each of the plurality of sensors based on:

$f_j(t) \propto \alpha p_{input}(t) - p_j$, where $p_{input}$ refers to pressure at an input of the pipeline network.

10. The method according to claim 8, wherein the tuning includes determining minimum values of $\Delta t_i$, $a_i$, $b_i$, $\alpha_i$ and $\beta_i$ to solve the numerical minimization model in the absence of the leak, solving including one of the numerical minimization model values being below a threshold value.

11. A computer program product for identifying a leak in a pipeline network, the computer program product comprising a computer readable storage medium having program instructions embodied therewith, the program instructions executable by a processor to perform a method comprising:
receiving pressure values measured at each of a plurality of sensors distributed along the pipeline network as a time-varying pressure signals;
tuning a model based on gas mass conservation law in the absence of the leak, the tuning including obtaining the time-varying pressure signal from each of the plurality of sensors; and
monitoring the time-varying pressure signals to detect the leak based on the model, wherein the tuning the model includes tuning a numerical minimization model of:

$$\left| \sum_{i \in US} \right] [ \sum_{t_{strt}+\Delta t_i}^{t_{end}+\Delta t_i} Q_i(t) - \sum_{i \in DS} \sum_{t_{strt}+\Delta t_i}^{t_{end}+\Delta t_i} Q_i(t) \right|_{norm} ,$$

US refers to upstream sensors among the plurality of sensors, DS refers to downstream sensors among the plurality of sensors, $t_{strt}$ to $t_{end}$ is a selected time interval with a delay $\Delta t_i$ specific to each of the upstream sensors or the downstream sensors, $t_{strt}$ and $t_{end}$ are selected to capture an entire cycle of mass flow, and Q(t) is isothermal mass flow rate, and the selected time interval is a same duration for every one of the upstream sensors and the downstream sensors;
comparing, using the processor, the numerical minimization model with a predetermined threshold value; and
identifying a leak within the pipeline network when the numerical minimization model is greater than the predetermined threshold value.

12. The computer program product according to claim 11, wherein the tuning the model includes determining Q(t) for each sensor as being proportional to:

$p_i(t) f_i(t)$, where p(t) is pressure and f(t) is flow rate.

13. The computer program product according to claim 12, wherein the determining Q(t) includes determining pressure and flow rate based on affine mapping according to:

$f_i = \alpha_i \hat{f}_i + \beta_i$ and $p_i = a_i \hat{p}_i + b_i$, where $\hat{f}$ and $\hat{p}$ are measured flow rate and measured pressure values, respectively, and $a_i$, $b_i$, $\alpha_i$, and $\beta_i$ are determined based on tuning the numerical minimization model.

14. The computer program product according to claim 13, wherein the tuning includes determining minimum values of $\Delta t_i$, $a_i$, $b_i$, $\alpha_i$ and $\beta_i$ to solve the numerical minimization model in the absence of the leak, solving including one of the numerical minimization model values being below a threshold value.

15. The method according to claim 1, wherein the monitoring the time-varying pressure signals includes performing pattern detection to detect an increase in the pressure.

16. The system according to claim 6, wherein the processor performs pattern detection on the time-varying pressure signals to detect an increase in the pressure.

17. The computer program product according to claim 11, wherein the monitoring the time-varying pressure signals includes performing pattern detection to detect an increase in the pressure.

* * * * *